US011636691B2

(12) United States Patent
Aoki et al.

(10) Patent No.: US 11,636,691 B2
(45) Date of Patent: Apr. 25, 2023

(54) SENSOR RECOGNITION INTEGRATION DEVICE

(71) Applicant: Hitachi Automotive Systems, Ltd., Hitachinaka (JP)

(72) Inventors: Naoto Aoki, Hitachinaka (JP); Shigenori Hayase, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 343 days.

(21) Appl. No.: 17/253,884

(22) PCT Filed: Jun. 11, 2019

(86) PCT No.: PCT/JP2019/023018
§ 371 (c)(1),
(2) Date: Dec. 18, 2020

(87) PCT Pub. No.: WO2019/244702
PCT Pub. Date: Dec. 26, 2019

(65) Prior Publication Data
US 2021/0271902 A1 Sep. 2, 2021

(30) Foreign Application Priority Data
Jun. 22, 2018 (JP) ............................ JP2018-118889

(51) Int. Cl.
*G06K 9/00* (2022.01)
*G06V 20/58* (2022.01)
(Continued)

(52) U.S. Cl.
CPC ............ *G06V 20/58* (2022.01); *B60W 40/04* (2013.01); *G06F 18/22* (2023.01); *G06F 18/251* (2023.01); *B60W 2554/4046* (2020.02)

(58) Field of Classification Search
None
See application file for complete search history.

(56) References Cited

U.S. PATENT DOCUMENTS

2017/0372149 A1* 12/2017 Mori .................... G06K 9/6288

FOREIGN PATENT DOCUMENTS

JP H04-2593 A 1/1992
JP 2012-163495 A 8/2012
JP 2014-169872 A 9/2014

OTHER PUBLICATIONS

International Search Report with English translation and Written Opinion issued in corresponding application No. PCT/JP2019/023018 dated Sep. 17, 2019.

* cited by examiner

*Primary Examiner* — Soo Jin Park
(74) *Attorney, Agent, or Firm* — Foley & Lardner LLP

(57) ABSTRACT

The present invention provides a sensor recognition integration device capable of preventing a rapid change in coordinates of an integrated object and preventing, for example, an erroneous determination in an autonomous driving plan determination device, even when the combination of sensors that perform detection changes. In the present invention, since an object position is estimated in a state where information of a position detected by a sensor that recognizes an object in an external field is corrected or
(Continued)

changed, the rapid change of coordinates of an integrated object is prevented even when the combination of sensors that perform detection changes.

10 Claims, 14 Drawing Sheets

(51) Int. Cl.

| | |
|---|---|
| ***B60W 40/04*** | (2006.01) |
| ***G06F 18/22*** | (2023.01) |
| ***G06F 18/25*** | (2023.01) |

SENSOR RECOGNITION INTEGRATION DEVICE

TECHNICAL FIELD

The present invention relates to a sensor recognition integration device, and more particularly to a sensor recognition integration device having a function of estimating the state of an object using information obtained by a plurality of sensors including different types of sensors detecting the object.

BACKGROUND ART

In autonomous driving of an automobile or the like, an object around the vehicle (external field) is recognized, and the driving is planned and determined in accordance with the recognition result. There are various sensors for detecting an object, such as a radar, a camera, a sonar, and a laser radar. Since the sensors have various conditions such as a detection range, a detectable object, detection accuracy, and cost, it is necessary to combine a plurality of sensors according to the purpose. However, in order to use data itself output by the combined sensors to perform operation planning and determination, it is necessary to examine the specifications in accordance with the combination of the sensors. In order to simplify the complexity, function of integrating information of combined sensors is required, and PTL 1 discloses an example of such a function.

CITATION LIST

Patent Literature

PTL 1: JP 2012-163495 A

SUMMARY OF INVENTION

Technical Problem

Even when the same object is detected, the coordinates of the object may vary depending on the sensor. This is because the detected portion in the object differs depending on the sensor. Thus, for example, when sensor information is integrated in accordance with the conventional technique disclosed in PTL 1 above, it is not possible to correct coordinates varying for each sensor, and the coordinates of an integrated object, which is generated by integrating sensor information may move rapidly every time the combination of the sensors that perform detection changes. Thus, there is a problem that, for example, an autonomous driving plan determination device that plans and determines driving by autonomous driving perform an erroneous determination.

The present invention has been made in view of the above circumstances, and an object thereof is to provide a sensor recognition integration device capable of preventing a rapid change in coordinates of an integrated object and preventing, for example, an erroneous determination in an autonomous driving plan determination device, even when the combination of sensors that perform detection changes.

Solution to Problem

In order to solve the above problem, according to the present invention, a sensor recognition integration device includes a sensor object information unit that generates integration object information by integrating sensor object information regarding a sensor object obtained by a plurality of external field recognition sensors recognizing an object in an external field. The sensor object information integration unit includes an integration object information storage unit that stores the integration object information, a prediction update unit that extracts a prediction object to be predicted from the integration object information which is previously stored in the integration object information storage unit, and predicts a position of the prediction object after a predetermined time, without using the sensor object information, an association unit that estimates the prediction object to be associated with the sensor object information, an offset parameter update unit that updates an offset parameter required for calculating an offset to be applied to the sensor object information, an integration target information generation unit that applies the offset to the sensor object based on the offset parameter and generates integration target information in which the prediction object and the offset-applied sensor object are linked to each other, based on an estimation result of the association unit, and an integration update unit that generates the integration object information including the estimated position of the object based on the integration target information.

In addition, according to the present invention, a sensor recognition integration device receives own-vehicle behavior information, sensor object information, sensor road information, positioning information, and map information acquired by an information acquisition device including an own-vehicle behavior recognition sensor, a plurality of external field recognition sensors, a positioning system, and a map unit, integrates the received information, and transmits a result of the integration to an autonomous driving plan determination device. The sensor recognition integration device includes a sensor object information integration unit that integrates the sensor object information regarding a sensor object obtained by the plurality of external field recognition sensors recognizing an object in an external field, as integration object information, and an own-vehicle surrounding information integration unit that integrates the integration object information, the own-vehicle behavior information, the sensor road information, the positioning information, and the map information as own-vehicle surrounding information and outputs the own-vehicle surrounding information to the autonomous driving plan determination device. The sensor object information integration unit includes an integration object information storage unit that stores the integration object information, a prediction update unit that extracts a prediction object to be predicted from the integration object information which is previously stored in the integration object information storage unit, and predicts a position of the prediction object after a predetermined time, without using the sensor object information, an association unit that estimates the prediction object to be associated with the sensor object information, an offset parameter update unit that updates an offset parameter required for calculating an offset to be applied to the sensor object information, an integration target information generation unit that calculates the offset to be applied to the sensor object information based on the offset parameter to apply the calculated offset to the sensor object and generates integration target information in which the prediction object and the offset-applied sensor object are linked to each other, based on an estimation result of the association unit, and an integration update unit that estimates the position of the object to generate integration object information, based on the integration target information.

Advantageous Effects of Invention

According to the present invention, since an object position is estimated in a state where information of a position detected by an external field recognition sensor that recognizes an object in an external field is corrected or changed, it is possible to prevent the rapid change of coordinates of an integrated object and to perform, for example, an erroneous determination in an autonomous driving plan determination device, even when the combination of external field recognition sensors that perform detection changes.

Objects, configurations, and advantageous effects other than those described above will be clarified by the descriptions of the following embodiments.

DESCRIPTION OF EMBODIMENTS

Hereinafter, embodiments of the present invention will be described in detail with reference to the drawings.

First Embodiment

<System Configuration of Autonomous Driving System Including Sensor Recognition Integration Device>

Figure 1:
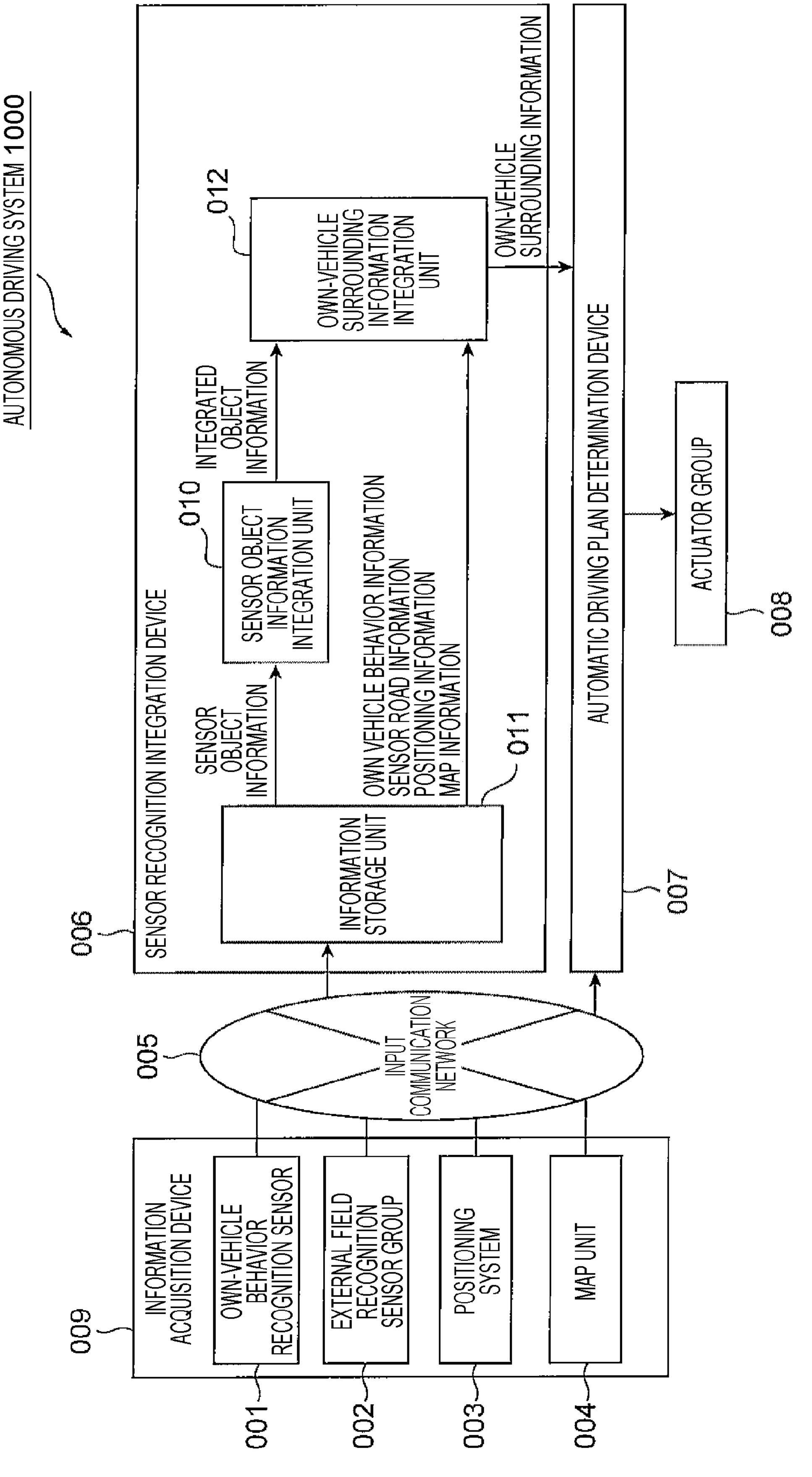
FIG. 1 is a system configuration diagram illustrating an autonomous driving system 1000 including a sensor recognition integration device 006 according to a first embodiment of the present invention.

FIG. 1 is a system configuration diagram illustrating an autonomous driving system 1000 including a sensor recognition integration device 006 according to a first embodiment of the present invention.

The autonomous driving system 1000 of the illustrated embodiment basically includes an information acquisition device 009, an input communication network 005, a sensor recognition integration device 006, an autonomous driving plan determination device 007, and an actuator group 008.

The information acquisition device 009 includes an own-vehicle behavior recognition sensor 001, an external field recognition sensor group 002, a positioning system 003, and a map unit 004. The own-vehicle behavior recognition sensor 001 includes a gyro sensor, a wheel speed sensor, a steering angle sensor, an acceleration sensor, and the like, which are mounted in a vehicle. The sensors acquire a yaw rate, a wheel speed, a steering angle, an acceleration, and the like representing the behavior of the own vehicle, respectively. Then, the own-vehicle behavior recognition sensor outputs the information (own-vehicle behavior information) to the input communication network 005. The external field recognition sensor group 002 detects and recognizes an object in the external field of the vehicle, a white line on the road, a sign, and the like, and outputs the information (sensor object information and sensor road information) to the input communication network 005. The external field recognition sensor group 002 uses a combination of a plurality of different external field recognition sensors (simply referred to as sensors below) such as a radar, a camera (a monocular camera, a stereo camera, and the like), and a sonar. There is no particular limitation on the configuration of the sensor. The positioning system 003 estimates the position of the vehicle and outputs positioning information to the input communication network 005. As an example of the positioning system 003, a satellite positioning system (also referred to as a global positioning system) is exemplified. The map unit 004 outputs map information around the vehicle to the input communication network 005.

The input communication network 005 receives the information from the information acquisition device 009 and transfers the received information to the sensor recognition integration device 006. As the input communication network 005, the controller area network (CAN), Ethernet (registered trademark), wireless communication, and the like are used. The CAN is a network generally used in an in-vehicle system.

The sensor recognition integration device 006 receives data of own-vehicle behavior information, sensor object information, sensor road information, positioning information, and map information from the input communication network 005 and integrates the received information as own-vehicle surrounding information (details will be described later). Then, the sensor recognition integration device outputs (transmits) the own-vehicle surrounding information to the autonomous driving plan determination device 007.

The autonomous driving plan determination device 007 receives the information from the input communication network 005 and the own-vehicle surrounding information from the sensor recognition integration device 006. The autonomous driving plan determination device plans and determines how to move the own vehicle, and outputs command information to the actuator group 008. The actuator group 008 includes various actuators for steering the own vehicle, and operates in accordance with the command information from the autonomous driving plan determination device 007.

<Internal Configuration of Sensor Recognition Integration Device>

The sensor recognition integration device 006 in the present embodiment includes an information storage unit 011, a sensor object information integration unit 010, and an own-vehicle surrounding information integration unit 012.

The information storage unit 011 stores information from the input communication network 005, and outputs information in response to requests from the sensor object information integration unit 010 and the own-vehicle surrounding information integration unit 012. The sensor object information integration unit 010 acquires the sensor object information from the information storage unit 011 and integrates the information of the same object, which is detected by a plurality of sensors, as the same information. Then, the sensor object information integration unit outputs the integration result to the own-vehicle surrounding information integration unit 012, as integration object information (details will be described later). The own-vehicle surrounding information integration unit 012 acquires the integration object information from the sensor object information integration unit 010, and the own-vehicle behavior information, the sensor road information, the positioning information, and the map information from the information storage unit 011. Then, the own-vehicle surrounding information integration unit integrates the acquired information as own-vehicle surrounding information and outputs the own-vehicle surrounding information to the autonomous driving plan determination device 007. A conventionally-known processing method can be applied to integration processing in the own-vehicle surrounding information integration unit 012. Thus, detailed description thereof will be omitted here, and the integration processing in the sensor object information integration unit 010 will be described below in detail.

<Internal Configuration of Sensor Object Information Integration Unit in Sensor Recognition Integration Device>

Figure 2:
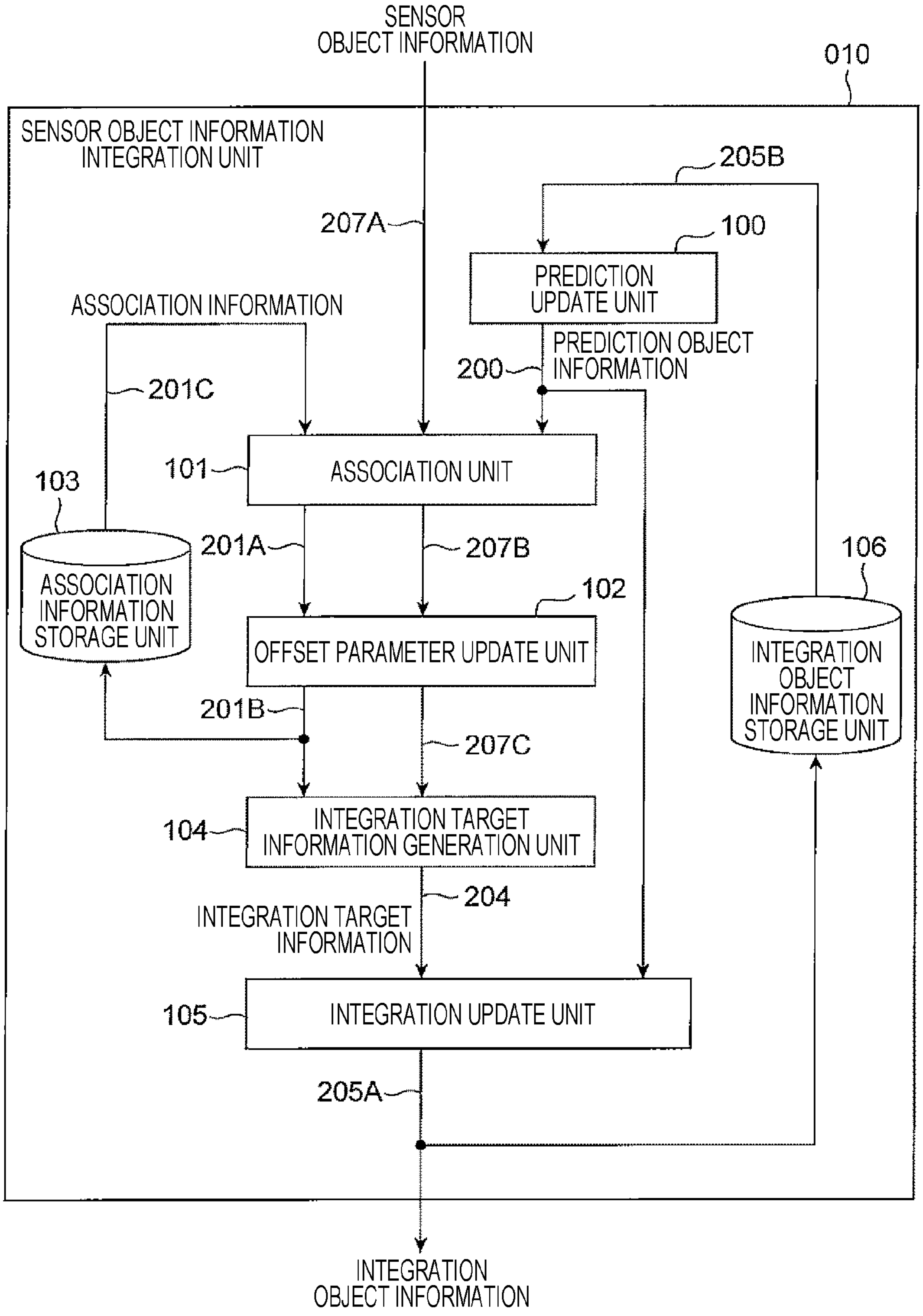
FIG. 2 is a functional block diagram illustrating a sensor object information integration unit 010 of the sensor recognition integration device 006 according to the first embodiment of the present invention.

FIG. 2 is a functional block diagram illustrating the sensor object information integration unit 010 in the sensor recognition integration device 006 according to the first embodiment of the present invention.

The sensor object information integration unit 010 of the illustrated embodiment mainly includes a prediction update unit 100, an association unit 101, an offset parameter update unit 102, an association information storage unit 103, an integration target information generation unit 104, an integration update unit 105, and an integration object information storage unit 106. The process of the sensor object information integration unit 010 is continuously and repeatedly executed many times. In each execution, it is defined at what time point the purpose is to estimate the information. For the description, in the following description, it is assumed that execution of estimating information at a time point t_1 is performed and then execution of estimating information at a time point t_2, which is the time point after a time Δt.

Before describing the function of each unit in the sensor object information integration unit 010, the information transmitted or received in the sensor object information integration unit 010 will be roughly described. The sensor object information 207A, 207B, and 207C has a sensor object ID assigned by a tracking process in the sensor, a relative position to the own vehicle, and a relative speed to the own vehicle. Information such as the object type, the detection time point, and the reliability of the information may be additionally held. The prediction object information 200 and the integration object information 205A and 205B have information on the time point of an estimation target, an object ID, a relative position of an object, the relative speed of the object, or the equivalent thereof. In addition, information such as the object type, an error covariance, and reliability of the information may be additionally held. In the association information 201A, 201B, and 201C, regarding an object ID of each object in the prediction object information 200, information indicating whether the object ID is excluded from the association at a time point t_2 of the current estimation target and information indicating an associated sensor object are record. The sensor object information regarding the associated sensor object includes the sensor type, the sensor object ID, information indicating whether the object is an association target at the time point t_1, an initial offset, and an offset duration time that is the time during which the offset application is continued. The integration target information 204 includes information about a sensor object that is a target of association (in other words, linking) with the object ID of each object in the prediction object information 200. The position and the speed of the sensor object information in the integration target information 204 does not necessarily match with the original sensor object information 207A, and an offset obtained from the initial offset, the offset duration time, and the like is applied.

The prediction update unit 100 that constitutes the sensor object information integration unit 010 receives, as an input, the integration object information 2053 at the time point t_1 (for example, integration object information 205B before one processing step) from the integration object information storage unit 106, and outputs the prediction object information 200 at the time point t_2 to the association unit 101 and the integration update unit 105. The association unit 101 receives, as an input, the sensor object information 207A from the information storage unit 011, the association information 201C at the time point t_1 (for example, association information 201C before one processing step) from the association information storage unit 103, the prediction object information 200 at the time point t_2, and outputs the association information 201A indicating which prediction object information 200 corresponds to which sensor object information at the time point t_2, to the offset parameter update unit 102. At this time, information indicating whether or not there is a disassociation, and information indicating whether there is an association target at the time point t_1 are added. In addition, the sensor object information 207A is output to the offset parameter update unit 102 as the sensor object information 207B without being changed. The offset parameter update unit 102 receives, as an input, the association information 201A at the time point t_2 and the sensor object information 207B, and outputs the association information 201B at the time point t_2 to the integration target information generation unit 104 and the association information storage unit 103. At the time point t_2, offset parameter information on the initial offset and the offset duration time is updated. In addition, the sensor object information 207B is output to the integration target information generation unit 104 as the sensor object information 207C without being changed. The association information storage unit 103 stores the association information 201B and outputs the association information 201B to the association unit 101 as the association information 201C. The integration target information generation unit 104 receives, as an input, the association information 201B at the time point t_2 and the sensor object information 207C, and links a result (sensor object to which offset application is completed) obtained by applying an offset to the coordinates and the speed of the corresponding object information to each prediction object at the time point t_2. Then, the integration target information generation unit outputs the result as the integration target information 204, to the integration update unit 105. The integration update unit 105 receives, as an input, the integration target information 204 and the prediction object information 200 at the time point t_2 from the prediction update unit 100. The integration update unit estimates what state (position, speed, and the like) each object is at the time point t_2. The integration update unit outputs a result of the estimation, as the integration object information 205A to the integration object information storage unit 106, and transmits the integration object information to the own-vehicle surrounding information integration unit 012. The integration object information storage unit 106 stores the integration object information 205A and outputs the integration object information as the integration object information 205B to the prediction update unit 100.

(Association Process of Association Unit)

Figure 3:
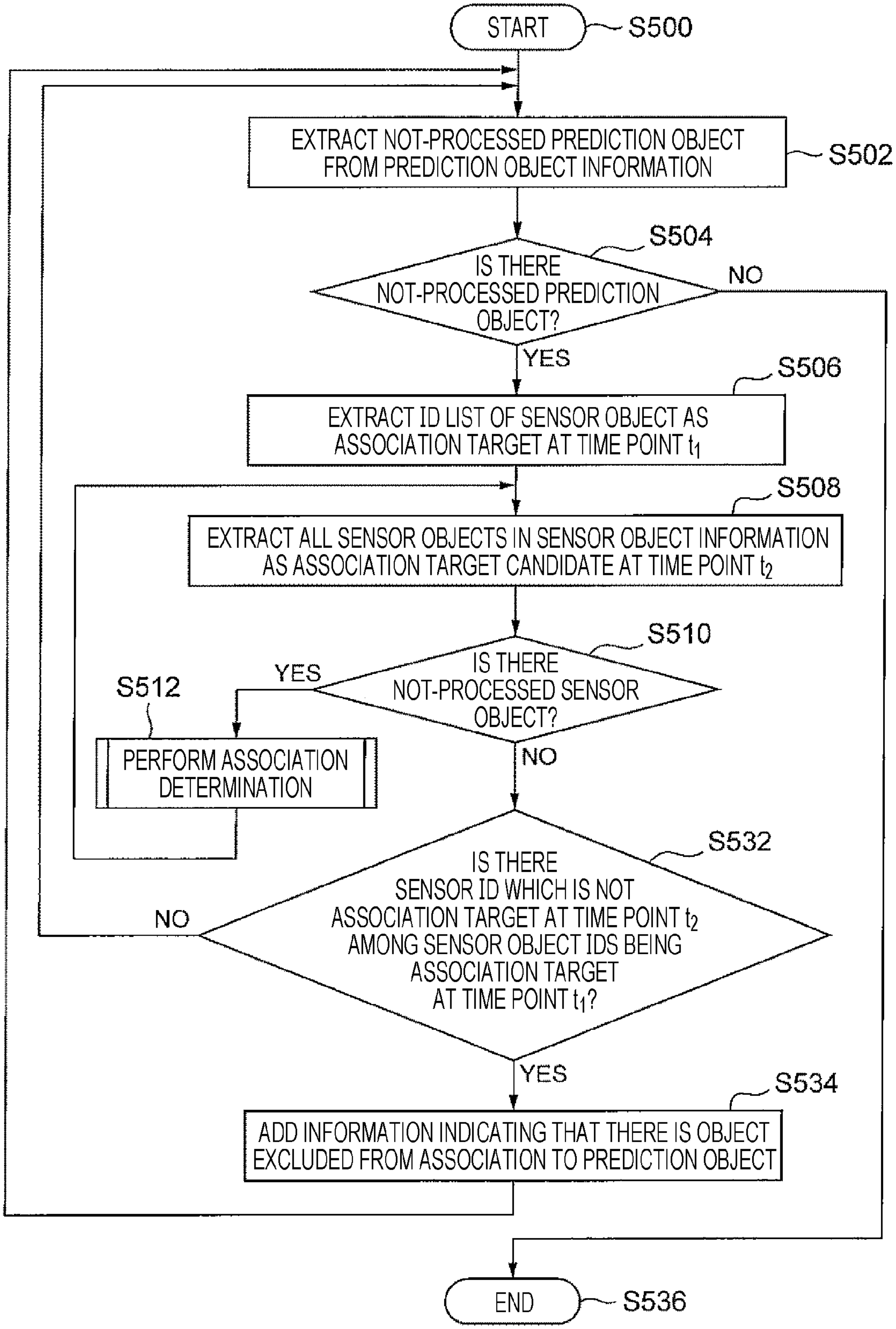
FIG. 3 is a flowchart executed by an association unit 101 of the sensor object information integration unit 010 in the first embodiment of the present invention.

FIG. 3 is a flowchart executed by the association unit 101 of the sensor object information integration unit 010 in the first embodiment of the present invention.

In S500, the process of the association unit 101 is started. In S502, a not-processed prediction object is extracted based on the prediction object information 200 from the prediction update unit 100. In S504, it is determined whether or not there is a not-processed prediction object. When there is the not-processed prediction object, the process proceeds to S506. In S506, the ID list of the sensor object information of the association target at the time point t_1 is extracted based on the association information 201C at a time point t_1 from the association information storage unit 103. In S508, all sensor objects in the sensor object information, which are association target candidates at a time point t_2 are extracted. Alternatively, it is possible to extract a set including at least all association targets by a method such as indexing. Next, in S510, it is determined whether or not there is a not-processed sensor object among the sensor objects being the association target candidates. When there is the not-processed sensor object, the association determination (details will be described later) is performed on the not-processed sensor object, in S512. Then, the process returns to S508. When there is no not-processed sensor object in S510, the process proceeds to S532. In S532, it is examined whether or not there is a sensor object which is not the association target at the time point t_1 among sensor object IDs being the association target at the time point t_2. When there is the sensor object which is not the association target, in S532, the process proceeds to S534. In S534, information indicating that there is a disassociation is added to the prediction object, and then the process returns to S502. The information added in S534 is used for offset parameter initialization (from S559 to S583 in FIG. 5) described later. When there is no sensor object that is not the association target, in S532, the process returns to S502. In S504, when there is no not-processed prediction object, the process ends (S536).

Figure 4:
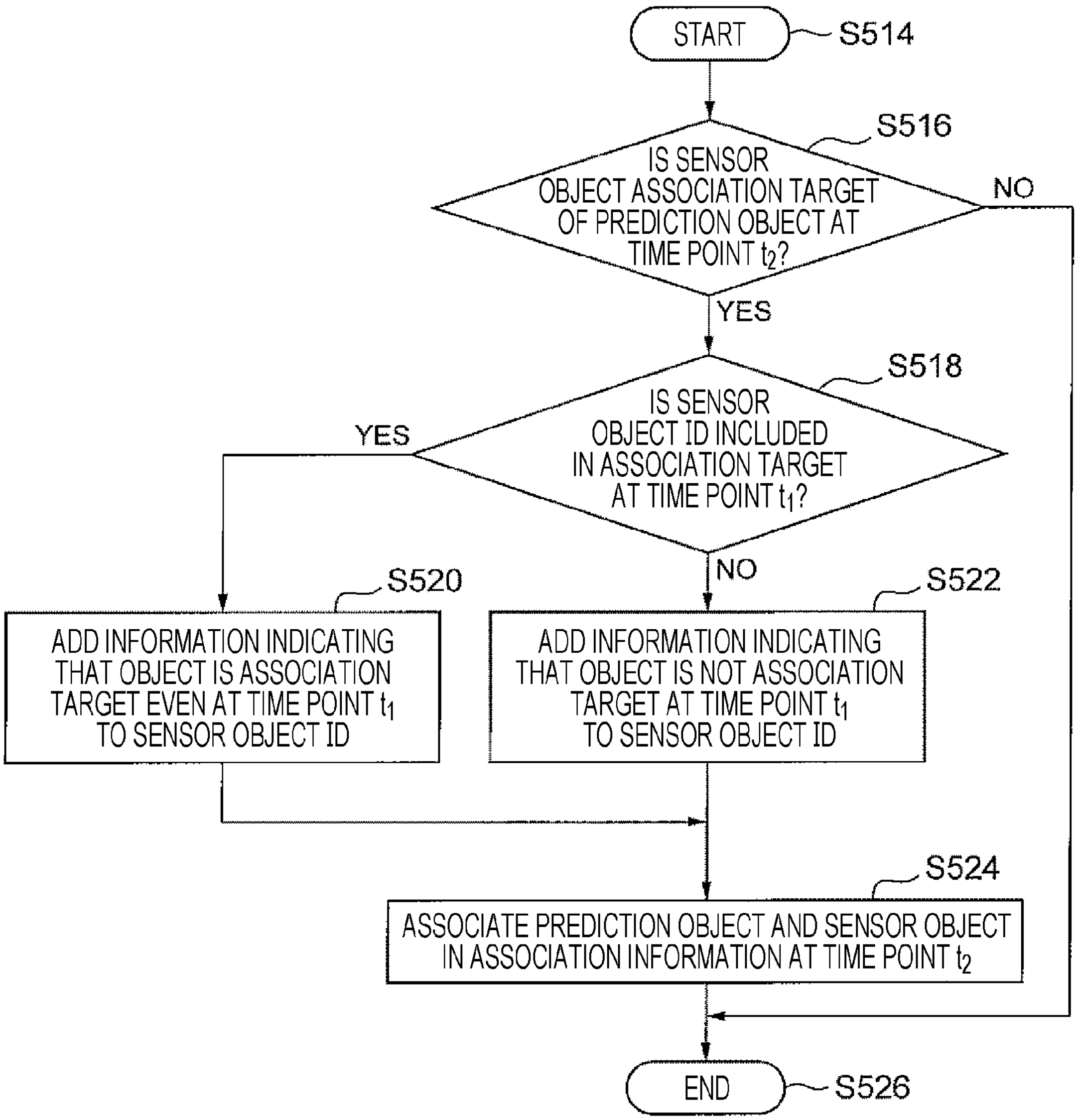
FIG. 4 is a flowchart illustrating association determination (S512) in a process of the association unit 101 of the sensor object information integration unit 010 in the first embodiment of the present invention.

FIG. 4 is a flowchart of association determination (S512) in the process of the association unit 101 of the sensor object information integration unit 010 in the first embodiment of the present invention.

In S514, the process starts. In S516, it is determined whether or not the sensor object is an association target of the prediction object at the time point t_2. When the sensor object is the association target, the process proceeds to S518. In S518, it is examined whether or not the sensor object ID is included in the association target at the time point t_1. When the sensor object ID is included, the process proceeds to S520. When the sensor object ID is not included, the process proceeds to S522. In S520, information indicating that the sensor object is the association target even at the time point t_1 is added to the sensor object ID. Then, the process proceeds to S524. In S522, information indicating that the sensor object is not the association target at the time point t_1 is added to the sensor object ID. Then, the process proceeds to S524. The information added in S520 and S522 is used for offset parameter update (from S568 to S574 in FIG. 5) described later. In S524, the prediction object and the sensor object are associated with each other in the association information 201C at the time point t_2, and the process of association determination (S512) ends (S526).

(Update Process of Offset Parameter Update Unit)

Figure 5:
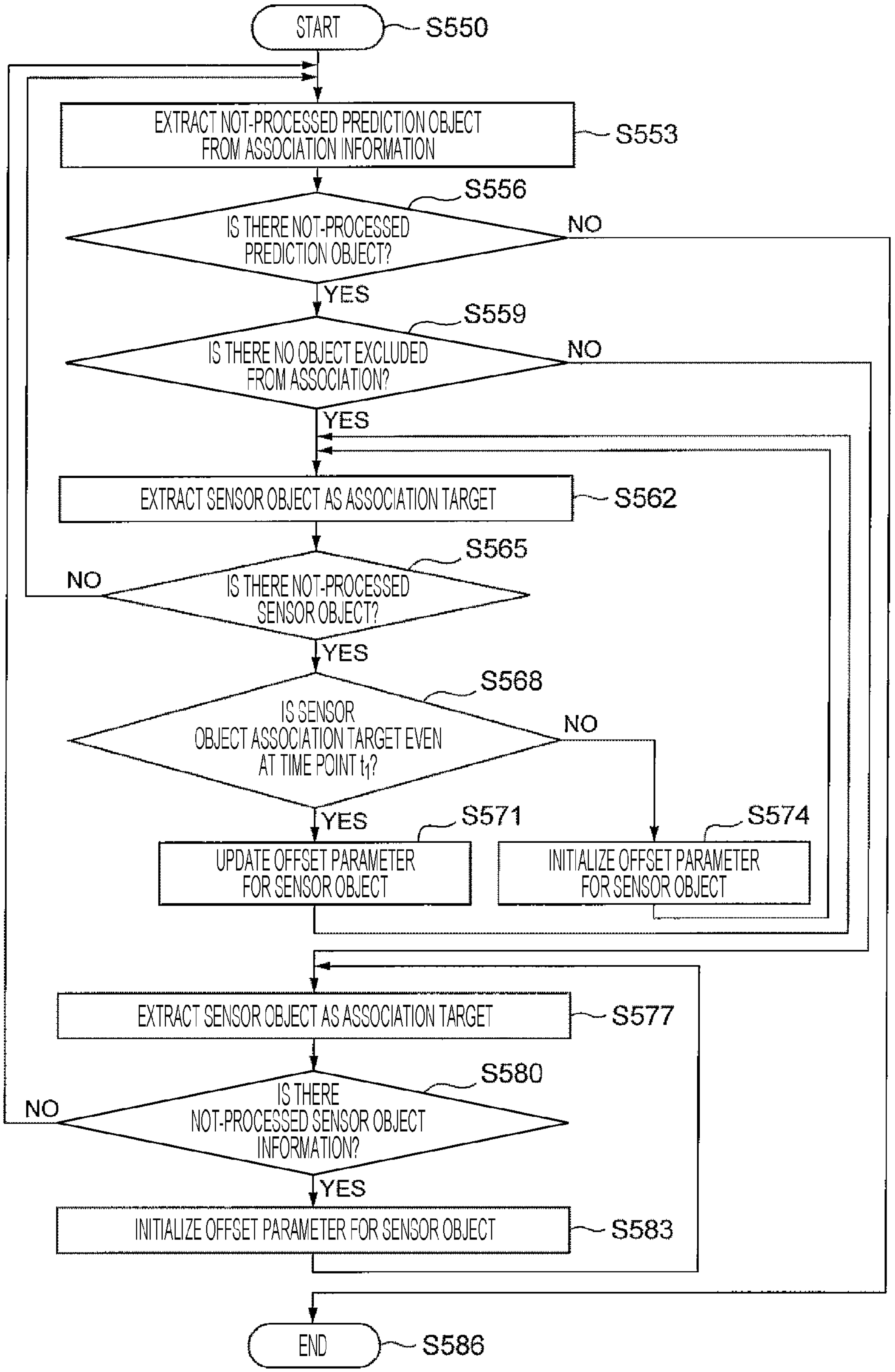
FIG. 5 is a flowchart executed by an offset parameter update unit 102 of the sensor object information integration unit 010 in the first embodiment of the present invention.

FIG. 5 is a flowchart executed by the offset parameter update unit 102 of the sensor object information integration unit 010 in the first embodiment of the present invention.

In S550, the process of the offset parameter update unit 102 is started. Then, the process proceeds to S553. In S553, a not-processed prediction object is extracted from the association information 201A from the association unit 101. In S556, it is determined whether or not there is a not-processed prediction object. When there is the not-processed prediction object, the process proceeds to S559. When there is no not-processed prediction object, the process proceeds to S586. In S559, it is determined whether or not there is any disassociation for the prediction object ID (see S534 in FIG. 3). When there is no disassociation for the prediction object ID, the process proceeds to S562. When there is any disassociation, the process proceeds to S577. In S562, the sensor object to be associated is extracted. Then, the process proceeds to S565. In S565, it is determined whether or not there is a not-processed sensor object. When there is the not-processed sensor object, the process proceeds to S568. When there is no not-processed sensor object, the process returns to S553. In S568, it is examined whether or not the sensor object is an association target even at the time point t_1 (see S520 and S522 in FIG. 4). When the sensor object is the association target, the process proceeds to S571. When the sensor object is not the association target, the process proceeds to S574. In S571, the offset parameter for the sensor object (specifically, offset parameter required to calculate the offset to be applied to the sensor object information) is updated. Then, the process returns to S562. The update of the offset parameter is to add the difference ($t\_2-t\_1$) of the estimation target time to the offset duration time t_offset of the association information 201A from the association unit 101. On the other hand, in S574, the offset parameter for the sensor object is initialized. Then, the process returns to S562. The contents of the process of initializing the offset parameter will be described. The initial offset is represented by Δx, the prediction object position is represented by X_prediction, and the sensor object position is represented by x_sensor. It is assumed that the position is a multi-dimensional quantity, and has an X component and a Y component. The position may be three-dimensional. In the initialization of the offset parameter, Δx is set to X_prediction−x_sensor, and the offset duration time is set to 0.

When the prediction object ID is disassociated in S559, the sensor object to be associated is extracted in S577, and then the process proceeds to S580. In S580, it is examined whether or not there is not-processed sensor object information. When there is the not-processed sensor object information, the process proceeds to S583. When there is no not-processed sensor object information, the process returns to S553. In S583, the offset parameter for the sensor object is initialized. The initialization of the offset parameter is the same process as S574 described above. If there is no not-processed prediction object in S556, the process of the offset parameter update unit 102 is ended in S586.

(Generation Process of Integration Target Information Generation Unit)

Figure 6:
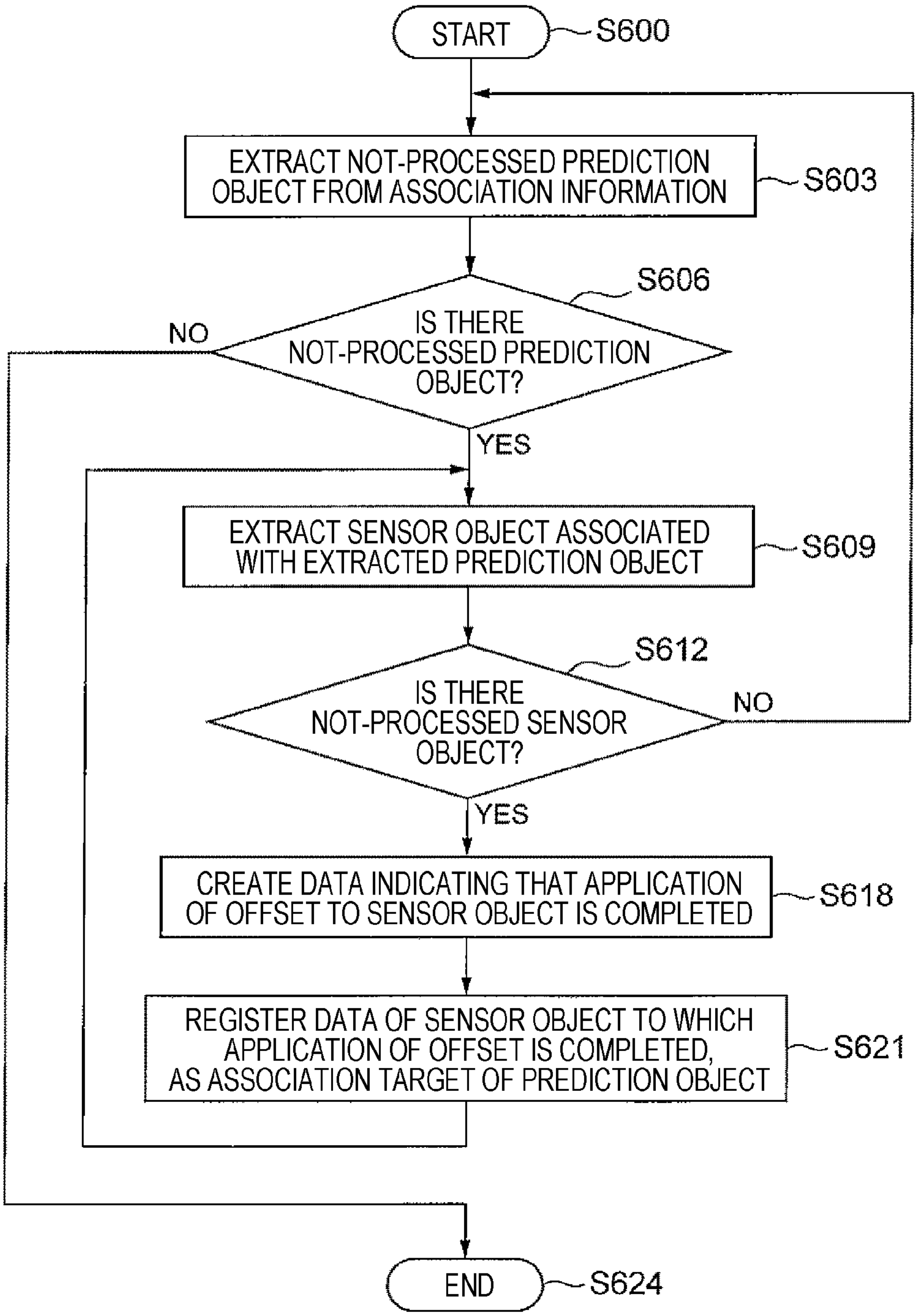
FIG. 6 is a flowchart executed by an integration target information generation unit 104 of the sensor object information integration unit 010 in the first embodiment of the present invention.

FIG. 6 is a flowchart executed by the integration target information generation unit 104 of the sensor object information integration unit 010 according to the first embodiment of the present invention.

In S600, the process of the integration target information generation unit 104 is started, and the process proceeds to S603. In S603, the not-processed prediction object is extracted from the association information 201B from the offset parameter update unit 102, and the process proceeds to S606. In S606, it is determined whether or not there is a not-processed prediction object. When there is the not-processed prediction object, the process proceeds to S609. When there is no not-processed prediction object, the process proceeds to S624. In S609, the sensor object associated with the extracted prediction object is extracted. Then, the process proceeds to S612. In S612, it is determined whether or not there is a not-processed sensor object. When there is the not-processed sensor object, the process proceeds to S618. When there is no not-processed sensor object, the process returns to S603. In S618, offset applied data is created for the sensor object. Then, the process proceeds to S621. The creation of data with the offset applied will be described. Here, the offset functions $c\_x(t,\Delta x,T)$ and $c\_v(t,\Delta x,T)$ relating to the position and the (relative) speed are introduced. This represents the offset to be applied to the sensor object. $c\_x(t,\Delta x,T)$ is set to $c\_x(t,\Delta x,T)=(1-t/T)\Delta x$ when $0\le t<T$, and is set to 0 in other cases. $c\_v(t,\Delta x,T)$ is normally set to 0. Here, T is a positive number, which is the time (offset application completion time) from when the offset is added to the sensor object until the offset is not added. When the offset duration time is set as t_offset, the coordinate of the sensor object is set as x_sensor, the speed is set as v_sensor, the initial offset is set as Δx, the position of the sensor object with the offset is set as x_offset, and the speed is set as v_offset, the sensor object after the offset is applied has a position of $x\_offset=x\_sensor+c\_x(t,\Delta x,T)$ and a speed of $v\_offset=v\_sensor+c\_v(t,\Delta x,T)$. Regarding the offset function, when $0\le t<T$, $c\_x(0,\Delta x,T)=\Delta x$, $c\_x(t,\Delta x,T)\cdot\Delta x>0$, and $c\_x(t,\Delta x,T)\cdot\Delta x$ monotonically decreases. When $c\_v(t,\Delta x,T)\cdot\Delta x\le 0$, the same effect can be obtained even though $c\_x(t,\Delta x,T)=0$ and $c\_v(t,\Delta x,T)=0$. Here, "·" represents the dot product of the vector. That is, here, the offset function in which the magnitude of the offset to be applied to the position of the sensor object is gradually decreased (damped) with time, and the magnitude becomes 0 for a predetermined period (offset application completion time) is adopted. Then, in S621, the data of the sensor object to which the offset has been applied is linked (grouped) as the association target of the prediction object and registered as the integration target information 204. Then, the process returns to S609. When there is no not-processed prediction object in S606, the process of the integration target information generation unit 104 is ended in S624.

(Update Process of Prediction Update Unit)

Figure 7:
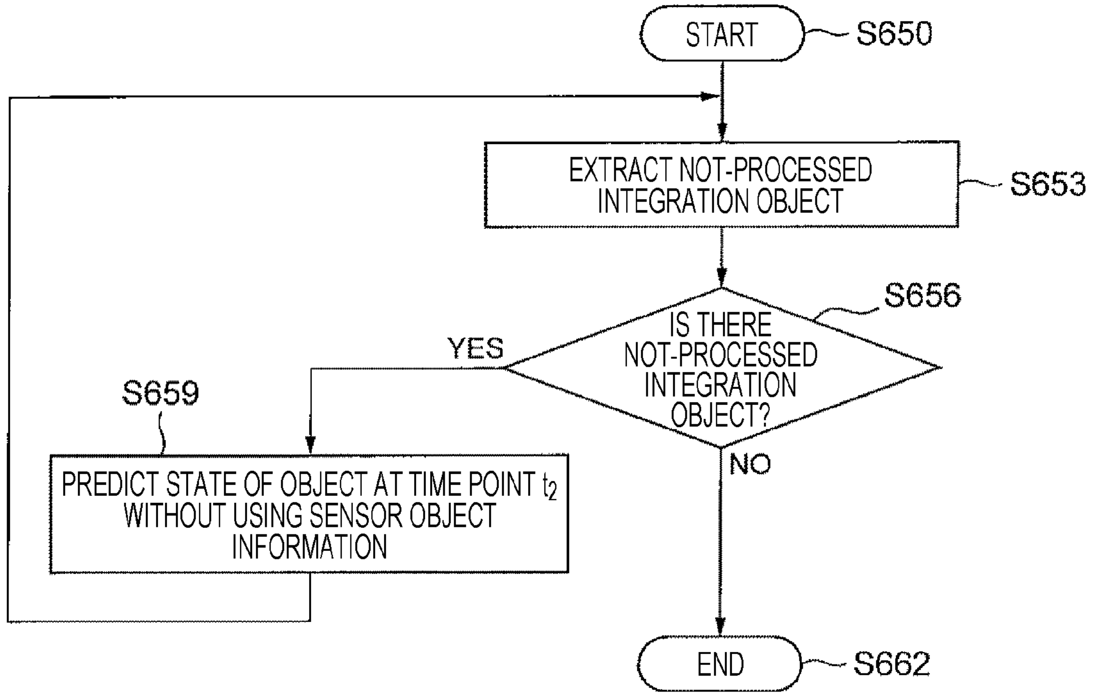
FIG. 7 is a flowchart executed by a prediction update unit 100 of the sensor object information integration unit 010 in the first embodiment of the present invention.

FIG. 7 is a flowchart executed by the prediction update unit 100 of the sensor object information integration unit 010 in the first embodiment of the present invention.

In S650, the process of the prediction update unit 100 is started. Then, the process proceeds to S653. In S653, a not-processed integrated object is extracted from the integration object information already (previously) stored in the integration object information storage unit 106. Then, the process proceeds to S656. In S656, it is determined whether or not there is a not-processed integrated object. When there is the not-processed integrated object, the process proceeds to S659. When there is no not-processed integrated object, the process proceeds to S662. In S659, the state (position or the like) of the object (prediction object) at the time point t_2 is predicted without using the sensor object information from the information storage unit 011. Then, the process returns to S653. A conventionally-known processing method can be applied to the object state prediction process in S659. When there is no not-processed integrated object in S656, the process of the prediction update unit 100 is ended in S662.

(Update Process of Integration Update Unit)

Figure 8:
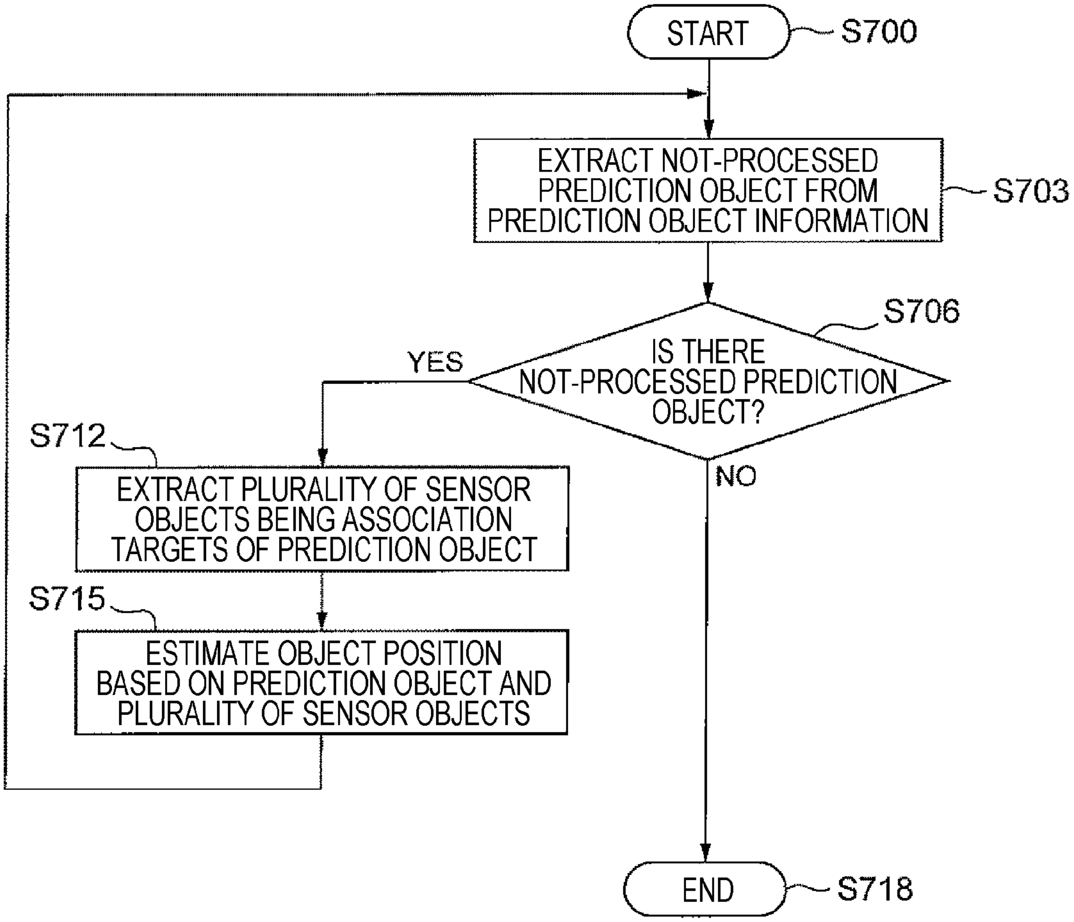
FIG. 8 is a flowchart executed by an integration update unit 105 of the sensor object information integration unit 010 in the first embodiment of the present invention.

FIG. 8 is a flowchart executed by the sensor object information integration unit 010 integration update unit 105 in the first embodiment of the present invention.

In S700, the processing of the integration update unit 105 is started. Then, the process proceeds to S703. In S703, the not-processed prediction object is extracted based on the prediction object information 200 from the prediction update unit 100. Then, the process proceeds to S706. In S706, it is determined whether or not there is a not-processed prediction object. When there is the not-processed prediction object, the process proceeds to S712. When there is no not-processed prediction object, the process proceeds to S718. In S712, a plurality of sensor objects that are association targets of the prediction object are extracted from the integration target information 204 from the integration target information generation unit 104. Then, the process proceeds to S715. In S715, the object position is estimated from the prediction object and the plurality of sensor objects, and the integration object information 205A including the estimated position of the object is transmitted to the own-vehicle surrounding information integration unit 012. Then, the process returns to S703. When there is no not-processed prediction object in S706, the process of the integration update unit 105 is ended in S718.

<Operation and Advantageous Effects of Sensor Recognition Integration Device>

The advantageous effects of preventing an occurrence of a situation in which the change amount of the position of the integrated object within a predetermined time due to the difference in the detection points of the sensors exceeds the threshold value of the change amount, which is set by the autonomous driving plan determination device 007, and avoiding an unnecessary operation determination, according to the present embodiment will be described below.

Figure 9:
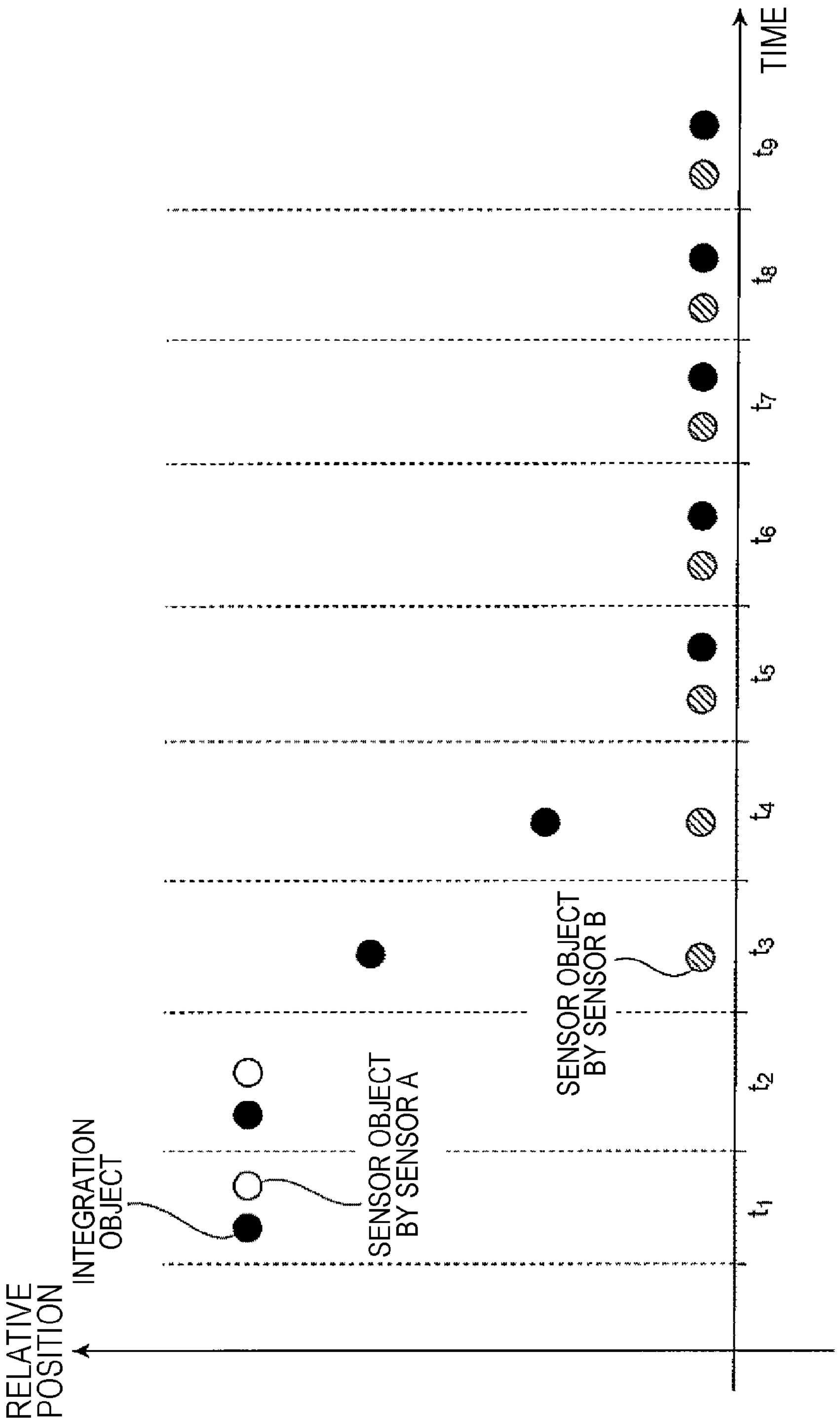
FIG. 9 is a schematic diagram illustrating a processing result example in which a rapid movement of an integrated object occurs by a difference in detection coordinates of sensors in a conventional technique.

FIG. 9 is a schematic diagram illustrating a processing result example in which a rapid movement of the integrated object occurs due to the difference in detection coordinates of the sensors in the sensor object information integration unit of a conventional sensor recognition integration device that does not apply an offset.

It is assumed that the actual object is continuously at a certain relative position. The sensor A detects the object at predetermined coordinates until the time point t_2. The sensor B also detects the object at predetermined coordinates after the time point t_3, but the coordinates are different from the coordinates detected by the sensor A. Until the time point t_2, the coordinates of the integrated object are estimated at the position corresponding to the position of the sensor A. After the time point t_3, the position of the integrated object moves toward the coordinates detected by the sensor B by the integration processing in the conventional technique. When time required for the time series filter used in the predictive update and the integrated update of the present embodiment to follow the original data is set as T_F1, the movement of the integrated object is also completed at T_F1.

Figure 10:
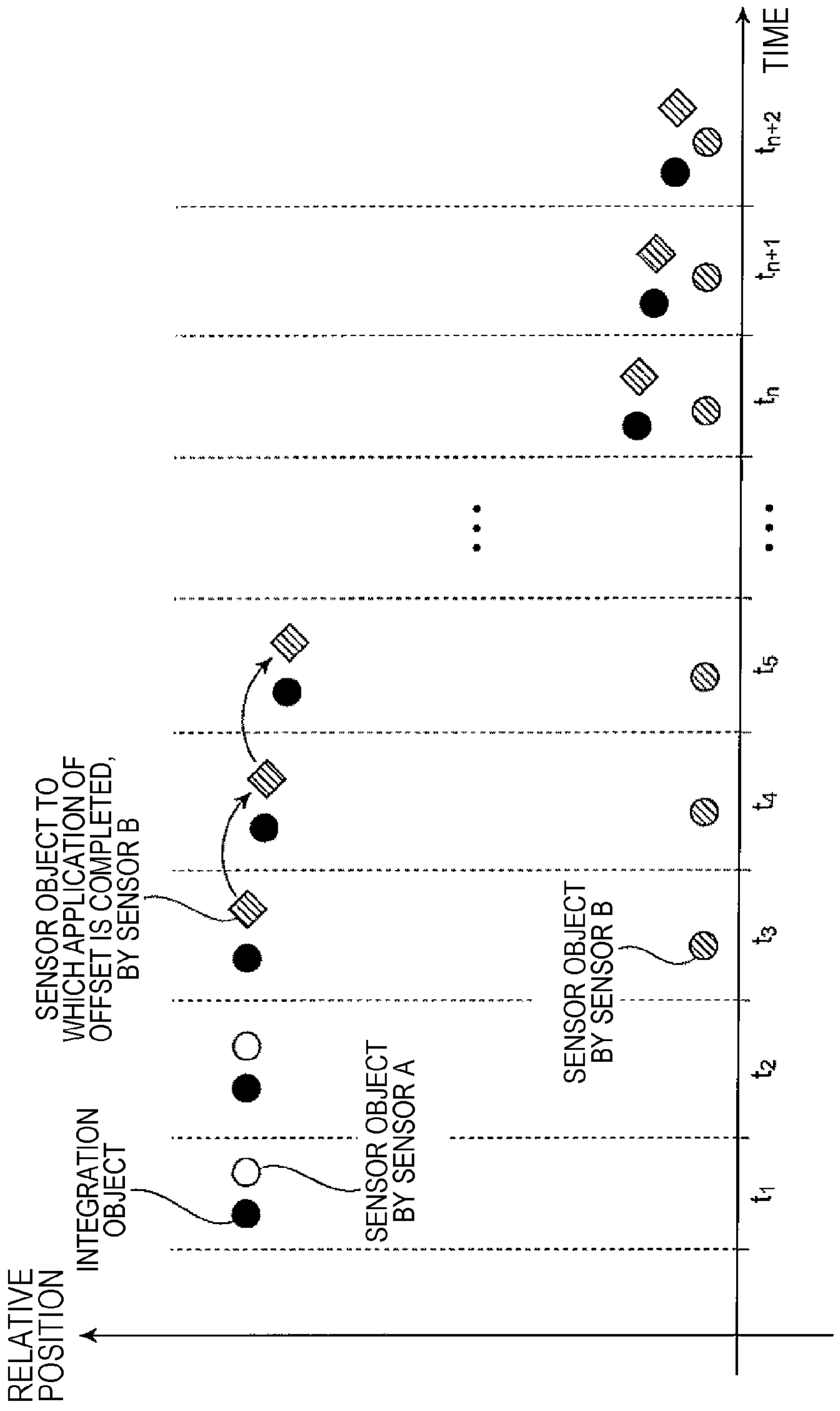
FIG. 10 is a schematic diagram illustrating a processing result example in which a rapid movement of the integrated object is suppressed even though there is the difference in detection coordinates of the sensors according to the first embodiment.

FIG. 10 is a schematic diagram illustrating a processing result example in which the rapid movement of the integrated object is suppressed even though there is the difference in detection coordinates of the sensors according to the present embodiment.

After the time point t_3, when the detection by the sensor B is started, the integration target information generation unit 104 generates the data of the sensor object to which the offset has been applied by the sensor B. Then, the generated data is input to the integration update unit 105. Since the data of the sensor object to which the offset has been applied by the sensor B moves over the time T during which the offset application is continued, the time when the integrated object completes the movement is T_F1+T.

To summarize the above description, according to the present embodiment, the time until the movement of the integrated object due to the difference in the detection points of the sensor is completed can be extended from T_F1 to T_F1+T, and the position of the integrated object within a fixed time can be changed. It is possible to prevent the change amount from exceeding the threshold value set by the autonomous driving plan determination device 007, and avoid the unnecessary determination.

Next, the advantageous effects that, when the object is actually moving, the movement of the integrated object corresponding to the movement is performed without causing an additional delay, and an additional delay does not occur in the determination of the autonomous driving plan determination device 007, according to the present embodiment, will be described below.

Figure 11:
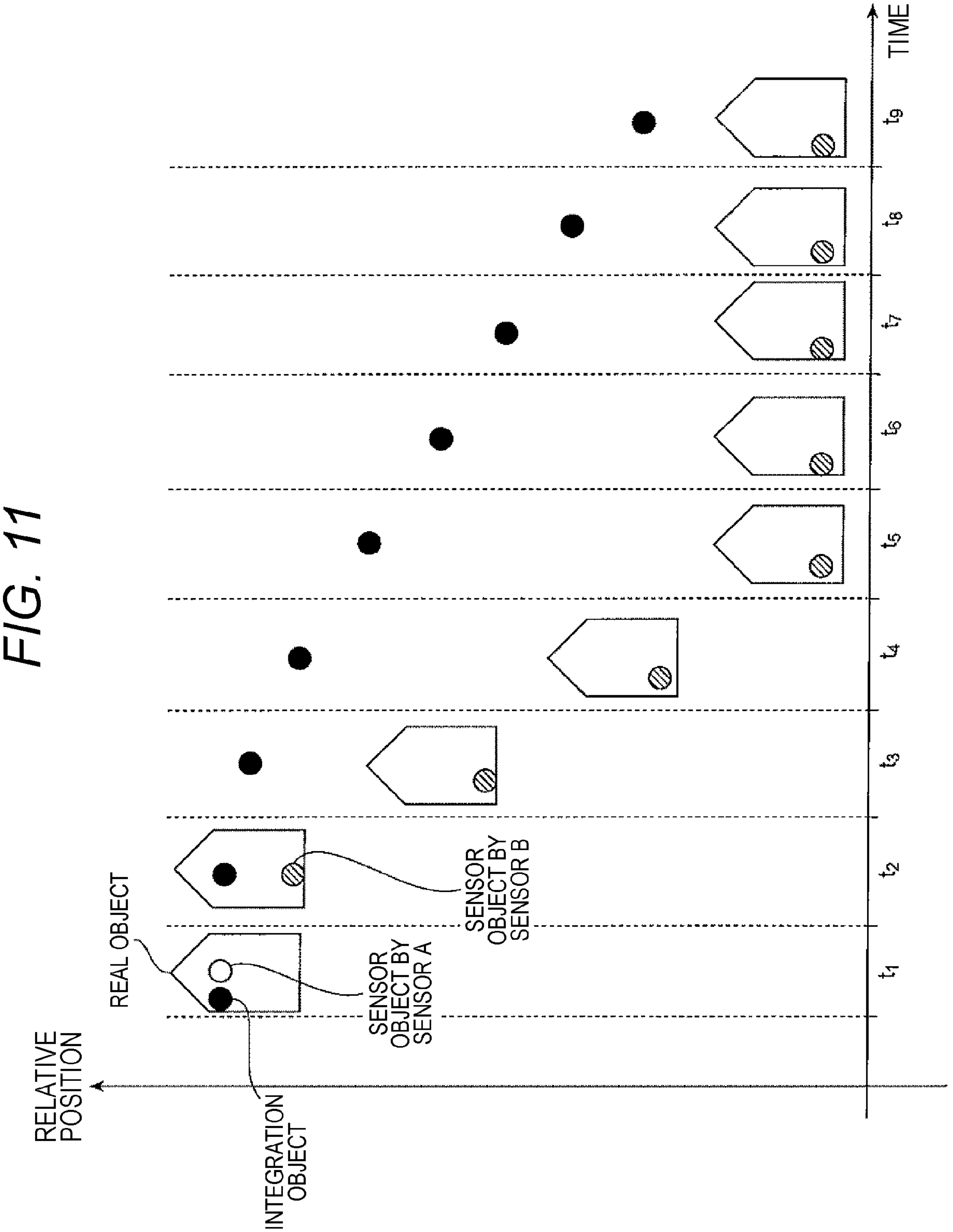
FIG. 11 is a schematic diagram illustrating a processing result example in which an additional delay time until the integrated object follows an input value is provided when an object moves actually in the conventional technique of taking measures different from that in the present invention for the problem of the rapid movement of the integrated object.

FIG. 11 is a schematic diagram illustrating a processing result example in which, the additional delay time occurs until the integrated object follows the input value when the object is actually moving, in the conventional technique of performing the countermeasures for the rapid movement of the integrated object, that, when the different sensor object is the association target, the reliability of the object is lowered and the integration update is performed, differing from the present invention.

The actual object starts moving at the time point t_2, as illustrated by the real object in FIG. 11. The moving is completed at the time $t_5$. On the other hand, the integrated object has a slower follow-up due to the integration processing by the filter of which reliability is lowered. When the filter with reduced reliability follows the original data in T_F2 time, it takes T_F2 time for the integrated object to follow the original data.

Figure 12:
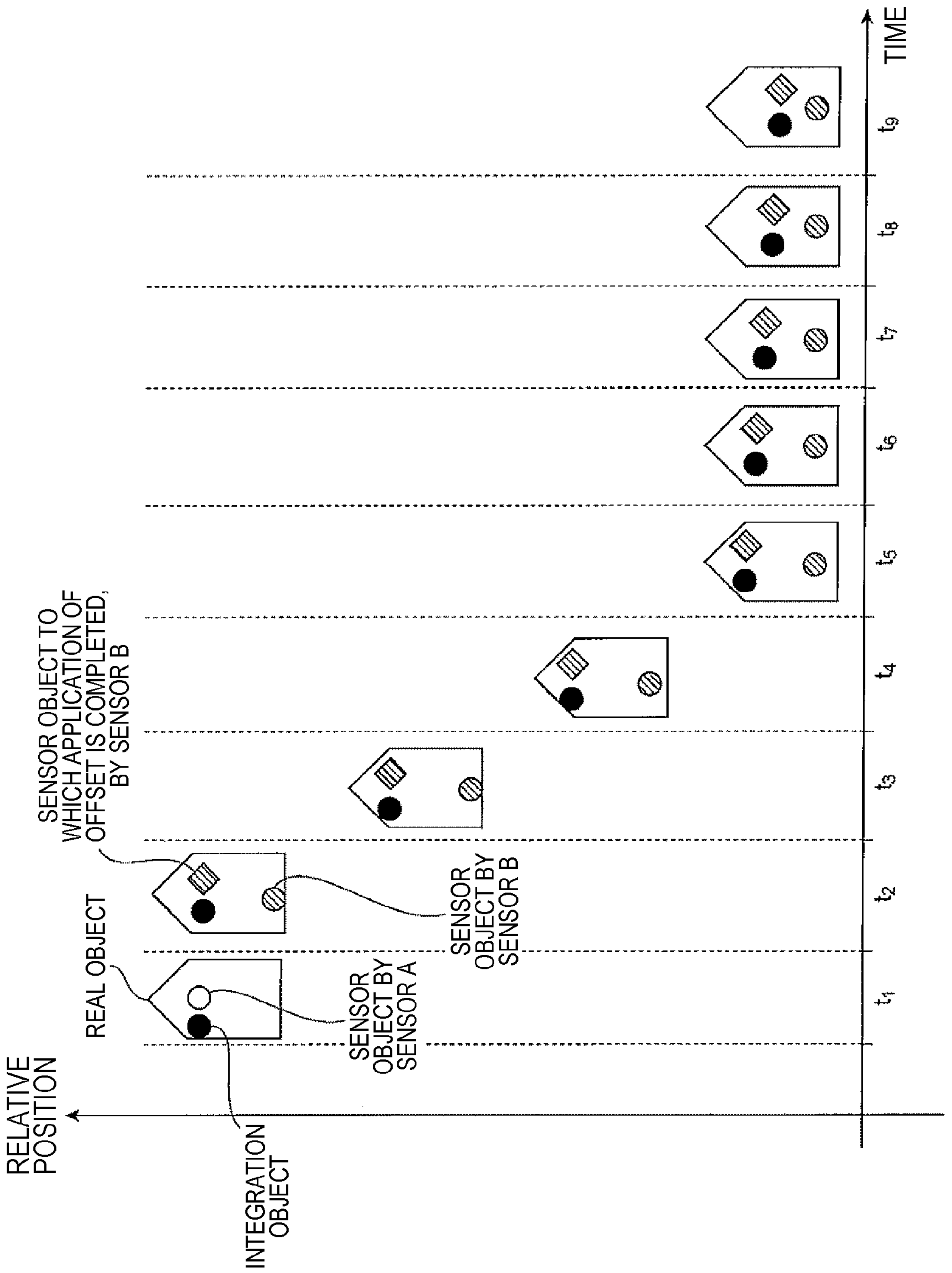
FIG. 12 is a schematic diagram illustrating a processing result example of suppressing the additional delay time until the integrated object follows the input value even when the object moves actually, according to the first embodiment.

FIG. 12 is a schematic diagram illustrating a processing result example of suppressing the additional delay time until the integrated object follows the input value even when the object moves actually, according to the present embodiment.

At the time point t_2, the sensor B starts detection, and the integration target information generation unit 104 generates the information to which the offset is applied. The sensor object to which the offset has been applied by the sensor B moves substantially parallel to the coordinates of the sensor object by the original sensor B in a time shorter than T, which is the time scale of the offset application. The integrated object also follows the data, and the following time is completed at T_F1.

That is, according to the present embodiment, no additional delay is caused to the actual movement of the object beyond the delay caused by the filter. As a result, no additional delay is caused in the determination by the autonomous driving plan determination device 007.

Further summarizing the effect description based on FIG. 10 and FIG. 12 described above, in FIG. 10, the data of the sensor object to which the offset has been applied by the sensor B moves over the time T while continuing the offset application, and (the magnitude of) the offset is applied to be gradually reduced with time. Thus, the data continues from the data of the sensor A to the time point t_2. When the detection of the sensor B is started, the data of the sensor object to which the offset has been applied by the sensor B is input to the integration update unit 105. Therefore, it is possible to obtain integrated results that are continuously connected. Further, in FIG. 12, the offset is almost unchanged. Thus, the offset-applied sensor object by the sensor B moves substantially parallel to the sensor object by the sensor B and gradually becomes closer to the original sensor object by the sensor B as the time passes. Accordingly, even though the relative position of the vehicle changes at t_3, the relative change is appropriately reflected as the sensor object to which the offset has been applied by the sensor B, and the sensor object is input to the integration update unit 105. Therefore, the integration result can be obtained without causing the additional delay.

As described above, in the present embodiment, since the object position is estimated in a state where information of the position detected by the sensor that recognizes an object in an external field is corrected or changed, it is possible to prevent the rapid change of coordinates of the integrated object and to perform, for example, an erroneous determination in the autonomous driving plan determination device 007, even when the combination of the sensors that perform detection changes.

Second Embodiment

The system configuration of the autonomous driving system, and the internal configuration and the processing flow of the sensor recognition integration device in a second embodiment are the same as those in the first embodiment described above with reference to FIGS. 1 to 8.

c_v(t,Δx,T) of the offset functions adopted in the offset applied data creation (S618) in the integration target information generation unit 104 in FIG. 6 in the second embodiment is different from that in the first embodiment. That is, in the second embodiment, c_v(t,Δx,T) is set to −Δx/T when 0≤t<T, and is set to 0 in other cases.

Alternatively, the offset function may be as described below. The condition of the first embodiment, c_x(0,Δx,T)=Δx, 0≤t<T, c_x(t,Δx,T)·Δx>0, c_x(t,Δx,T)·Δx Monotonically decreases, c_v(t,Δx,T)·Δx≤0, and when T≤t, c_x(t,Δx,T)=0, c_v(t,Δx,T)=0, and 0≤t<T, the integral relation of $$c_x(t,\Delta x,T)=\int_T^t c_v(t,\Delta x,T)dt \quad \text{[Math. 1]}$$

is satisfied. That is, here, an offset function is adopted in which the offset to be applied to the speed of the sensor object is the derivative of the offset to be applied to the position of the sensor object.

Since the offset function in the present embodiment is adopted, in addition to the effect of the first embodiment, when the applied amount of the offset is changed, the consistency of the offset of the speed (relative speed) is also secured and applied. Thus, the effect of preventing the occurrence of a situation in which the offset-applied sensor object is excluded from the association in the association when the association considering the speed is performed is obtained.

Third Embodiment

The system configuration of the autonomous driving system and the internal configuration and processing flow of the sensor recognition integration device in the third embodiment are the same as those in the first embodiment and the second embodiment described above with reference to FIGS. 1 to 8.

In the third embodiment, the offset function adopted in the offset-applied data creation (S618) in the integration target information generation unit 10 in FIG. 6 is different from that in the second embodiment. That is, in the third embodiment, when 0≤t<T, the offset functions c_x(t,Δx,T) and c_v(t,Δx,T) are $$c_x(t,\Delta x,T)=\frac{1}{2}\left(\cos\left(\frac{\pi t}{T}\right)+1\right)\Delta x \quad \text{[Math. 2]}$$

$$c_v(t,\Delta x,T)=-\frac{\pi}{2T}\sin\left(\frac{\pi t}{\tau}\right)\Delta x \quad \text{[Math. 3]}$$

and, in other cases, c_x(t,Δx,T)=0 and c_v(t,Δx,T)=0. The other processes are the same.

Alternatively, the offset function may be as described below. The condition of the second embodiment, c_x(0,Δx,T)=Δx, 0≤t<T, c_x(t,Δx,T)·Δx>0, c_x(t,Δx,T)·Δx Is monotonically decreasing, c_v(t,Δx,T)·Δx≤0, T≤t c_x(t,Δx,T)=0, c_v(t,Δx,T)=0, 0≤t<T, the integral relation of $$c_x(t,\Delta x,T)=\int_T^t c_v(t,\Delta x,T)dt \quad \text{[Math. 4]}$$

is satisfied. In addition to such a condition, c_v(0,Δx,T)=c_v(T,Δx,T)=0, c_v(t,Δx,T)·Δx>c_v(T/2,Δx,T), this satisfies the condition that Δx and c_v(t,Δx,T) are continuous functions with respect to t. That is, here, the offset function in which the magnitude of the offset to be applied to the speed of the sensor object is gradually decreased (damped) with time, and the magnitude becomes 0 for a predetermined period (offset application completion time) is adopted.

Since the offset function in the present embodiment is adopted, in addition to the effect of the second embodiment, the effect as follows is obtained. That is, when the speed (relative speed) of the integrated object changes more than the predetermined threshold value within the predetermined time, it is determined that the autonomous driving plan determination device 007 rapidly reduces the speed of the object or rapidly increases the speed of the object, and thus the occurrence of a situation in which the unnecessary acceleration or deceleration of the own vehicle is performed. This will be supplemented with the description below.

Figure 13:
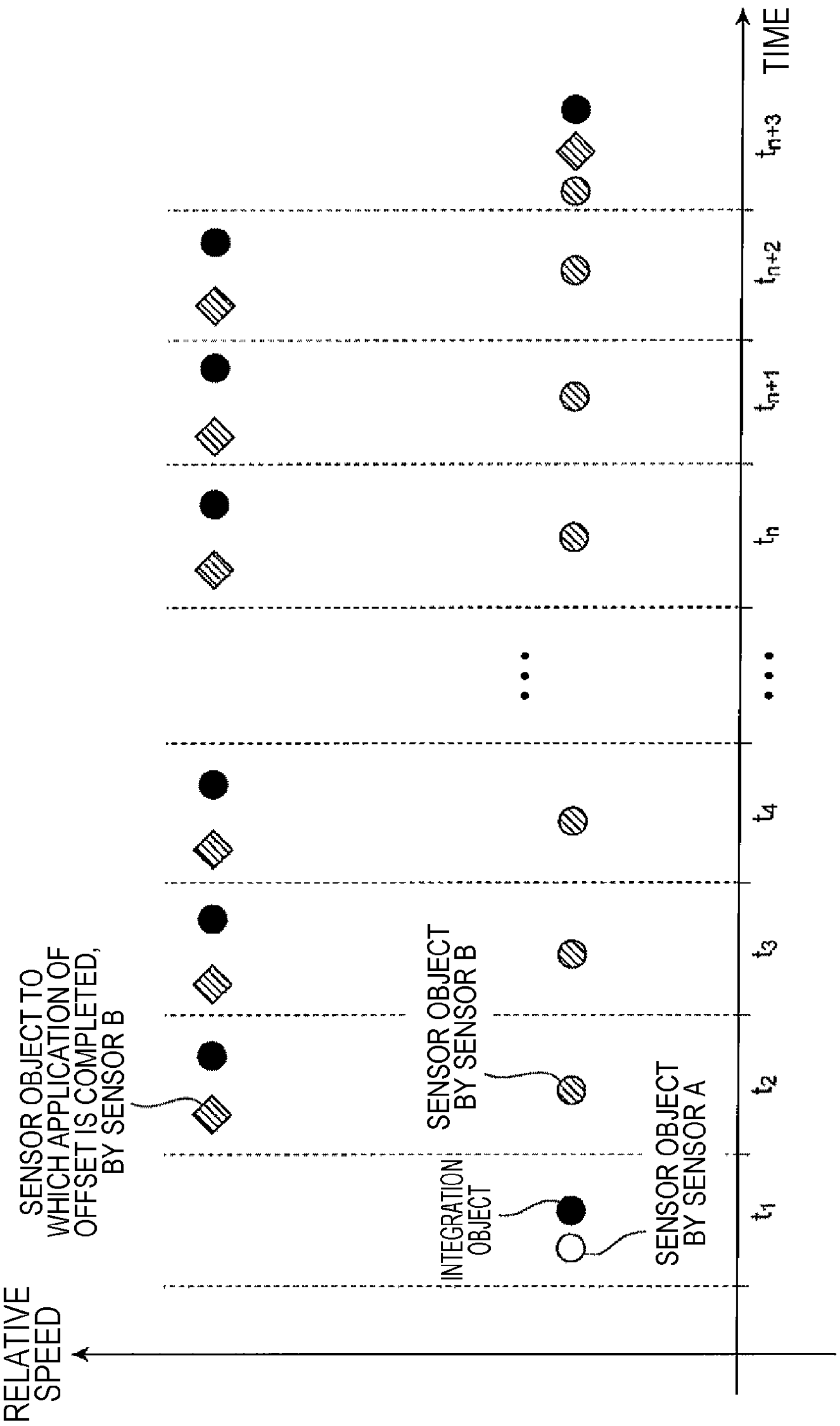
FIG. 13 is a schematic diagram illustrating a processing result example in which a speed value of the integrated object changes rapidly when an offset is applied, in a second embodiment of the present invention.

FIG. 13 is a schematic diagram illustrating a processing result example, for example, in which the speed value of the integrated object changes rapidly when the offset is applied, in the second embodiment of the present invention.

It is assumed that the object actually has a constant speed. The sensor A can accurately detect the speed of the object, and detects the speed until the time point t_1. The sensor B starts detection after the time point t_2, and the sensor B can also accurately detect the speed of the object. It is assumed that the sensor A and the sensor B detect different positions. According to the process of the second embodiment, the offset is applied to the speed due to the difference in position, and the information of the sensor object to which the offset has been applied by the sensor B is generated. Since the speed of the integrated object is also updated using the speed information of the sensor object to which the offset has been applied by the sensor B, the speed of the integrated object changes. The time until the change in speed is completed is T_F1 which is the time scale of the filter.

Figure 14:
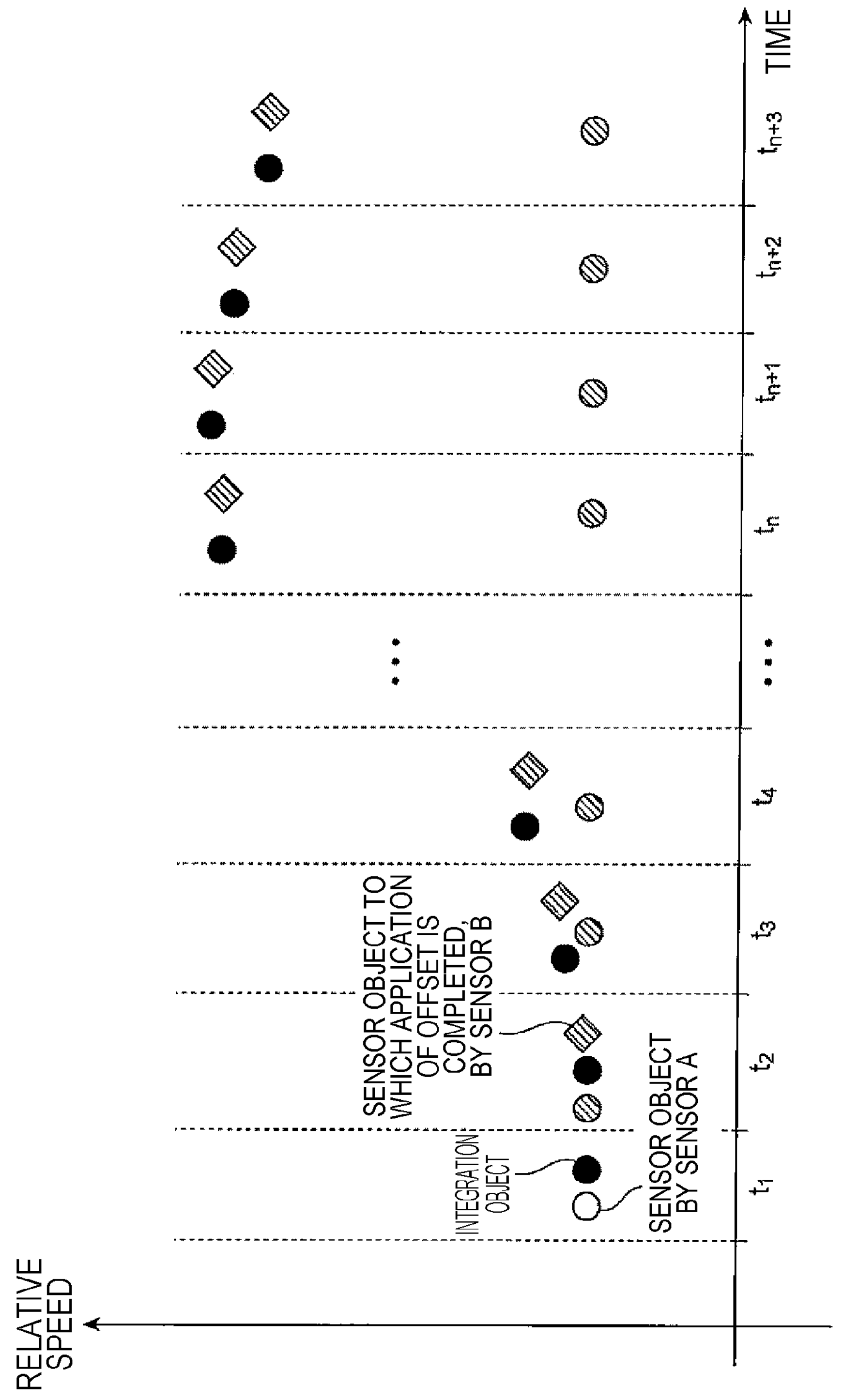
FIG. 14 is a schematic diagram illustrating a processing result example in which a rapid change in the speed value of the integrated object when the offset is applied is suppressed, in a third embodiment of the present invention.

FIG. 14 is a schematic diagram illustrating a processing result example in which a rapid change in the speed value of the integrated object when the offset is applied is suppressed, in the third embodiment of the present invention.

According to the third embodiment, the offset is applied to the speed as well, but it takes T_2 until the offset applied to the speed becomes the maximum, differing from the second embodiment. It also takes T_2 from the state where the offset applied to the speed is maximum to the state where no offset is applied. Therefore, the time until the speed change is completed is extended to T_2.

As a result, as described above, the effects as follows are obtained. That is, it is possible to prevent the change of the speed (relative speed) of the integrated object beyond the predetermined threshold value within the predetermined time, to avoid the determination that the autonomous driving plan determination device 007 rapidly decelerates or accelerates the object, and to avoid the unnecessary acceleration or deceleration of the own vehicle.

Fourth Embodiment

The system configuration of the autonomous driving system and the internal configuration and processing flow of the sensor recognition integration device in a fourth embodiment are the same as those in the first embodiment, the second embodiment, and the third embodiment described with reference to FIGS. 1 to 8.

In the fourth embodiment, the offset function adopted in the data creation (S618) in which the offset has been applied in the integration target information generation unit 104 in FIG. 6 is different from that in the third embodiment. That is, in the fourth embodiment, r_4 that satisfies 0<r_4<½ is set in advance, and $$T_4=r_4T \quad \text{[Math. 5]}$$

$$a_4=\frac{1}{T_4(T-T_4)} \quad \text{[Math. 6]}$$

is introduced in advance. When 0≤t<T_4, the offset functions c_x(t,Δx,T) and c_v(t,Δx,T) are as follows.

$$c_x(t, \Delta x, T) = \left(1 - \frac{t^2}{2a_4}\right)\Delta x \quad \text{[Math. 7]}$$

$$c_v(t, \Delta x, T) = -a_4 t \Delta x \quad \text{[Math. 8]}$$

When $T\_4 \leq t < T - T\_4$ $$c_x(t, \Delta x, T) = (-a_4 T_4 (t - 0.5t) + 0.5)\Delta x \quad \text{[Math. 9]}$$

$$c_v(t, \Delta x, T) = -a_4 T_4 \Delta x \quad \text{[Math. 10]}$$

When $T - T\_4 \leq t < T\_4$ $$c_x(t, \Delta x, T) = 0.5a_4(T - t)^2 \Delta x \quad \text{[Math. 11]}$$

$$c_v(t, \Delta x, T) = -a_4(T - t)\Delta x \quad \text{[Math. 12]}$$

[Math. 7]

In other words, this can calculate a function similar to the offset function of the third embodiment, only by the product-sum operation without using the trigonometric function. The other processes are the same.

Since the offset function in the present embodiment is adopted, in addition to the effect of the third embodiment, the effect of reducing the processing of the trigonometric function that requires a longer processing time than the product-sum operation and reducing the processing time is obtained.

Fifth Embodiment

The system configuration of the autonomous driving system and the internal configuration and processing flow of the sensor recognition integration device in a fifth embodiment are the same as those in the first embodiment, the second embodiment, the third embodiment, and the fourth embodiment described with reference to FIGS. 1 to 8. Further, regarding the offset function adopted in the data creation with offset application (S618) in the integration target information generation unit 104 in FIG. 6, any of the ones presented in the first to fourth embodiments may be adopted.

In the present fifth embodiment, for the offset function, when the magnitude of the initial offset Δx is less than or equal to a certain threshold value x_5, that is, $$\sqrt{|\Delta x|^2} \leq x_5 \quad \text{[Math. 13]}$$

In this case (that is, when the prediction object and the sensor object are sufficiently close to each other), c_x(t,Δx, T)=0 and c_v(t,Δx,T)=0. Here, x_5 is a positive number. That is, here, when it is determined that the initial offset is small and the offset should not be applied depending on the condition of the sensor object, the offset is not applied.

According to the present embodiment, in addition to the effects of those adopted in the first to fourth embodiments, the effects as follows are obtained. That is, when the initial offset is small, the offset application is not performed, and the adverse effect on the autonomous driving plan determination device 007 due to the offset application is avoided, and the processing time is reduced.

Sixth Embodiment

The system configuration of the autonomous driving system and the internal configuration and processing flow of the sensor recognition integration device in a sixth embodiment are the same as those in the first embodiment, the second embodiment, the third embodiment, and the fourth embodiment described with reference to FIGS. 1 to 8.

Any one of the offset functions presented in the first to fourth embodiments is adopted. When $$\tilde{c}_x(t, \Delta x, T) \quad \text{[Math. 14]}$$

$$\tilde{c}_v(t, \Delta x, T), \quad \text{[Math. 15]}$$

the offset function in the sixth embodiment is used as the following expressions.

$$\tilde{c}_v(t, \Delta x, T) \quad \text{[Math. 16]}$$

$$\tilde{c}_v(t, \Delta x, k_6|\Delta x|) \quad \text{[Math. 17]}$$

Here, k_6 is a positive number. The other processes are the same. That is, here, the offset function of determining the offset application completion time for each prediction object, or the offset function of causing the maximum value (temporal maximum value) of the magnitude of the difference vector between the offset applied to the position or speed of the sensor object and the offset applied to the position or speed of the sensor object before the predetermined time to be equal to any prediction object is adopted.

According to the present embodiment, in addition to the effects of those adopted in the first to fourth embodiments, the maximum value of the magnitude of change in offset becomes the same for any prediction object. The time to continue offset application changes (for example, the time T is extended) in accordance with the magnitude of the initial offset. When the initial offset is small, the time to continue the offset application is reduced. As a result, it is possible to obtain the effect of avoiding the adverse effect of the offset application on the autonomous driving plan determination device 007 and the effect of reducing the processing time.

The present invention is not limited to the above embodiments, and various modification forms may be provided. For example, the above embodiment is described in detail in order to explain the present invention in an easy-to-understand manner, and the above embodiment is not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced.

Some or all of the configurations, functions, functional units, processing means, and the like may be realized in hardware by being designed with an integrated circuit, for example. Further, the above-described respective components, functions, and the like may be realized by software by the processor interpreting and executing a program for realizing the respective functions. Information such as a program, a table, and a file, that realizes each function can be stored in a memory, a storage device such as a hard disk and a solid state drive (SSD), or a recording medium such as an IC card, an SD card, and a DVD.

Control lines and information lines considered necessary for the descriptions are illustrated, and not all the control lines and the information lines in the product are necessarily shown. In practice, it may be considered that almost all components are connected to each other.

REFERENCE SIGNS LIST

001 own-vehicle behavior recognition sensor
002 external field recognition sensor group

003 positioning system
004 map unit
005 input communication network
006 sensor recognition integration device
007 autonomous driving plan determination device
008 actuator group
009 information acquisition device
010 sensor object information integration unit
011 information storage unit
012 own-vehicle surrounding information integration unit
100 prediction update unit
101 association unit
102 offset parameter update unit
103 association information storage unit
104 integration target information generation unit
105 integration update unit
106 integration object information storage unit
200 prediction object information
204 integration target information
201A, 201B, 201C association information
205A, 205B integration object information
207A, 207B, 207C sensor object information
1000 autonomous driving system

The invention claimed is:

1. A sensor recognition integration device comprising:

a sensor object information unit that generates integration object information by integrating sensor object information regarding a sensor object obtained by a plurality of external field recognition sensors recognizing an object in an external field, wherein the sensor object information integration unit includes an integration object information storage unit that stores the integration object information, a prediction update unit that extracts a prediction object to be predicted from the integration object information which is previously stored in the integration object information storage unit, and predicts a position of the prediction object after a predetermined time, without using the sensor object information, an association unit that estimates the prediction object to be associated with the sensor object information, an offset parameter update unit that updates an offset parameter required for calculating an offset to be applied to the sensor object information, an integration target information generation unit that applies the offset to the sensor object based on the offset parameter and generates integration target information in which the prediction object and the offset-applied sensor object are linked to each other, based on an estimation result of the association unit, and an integration update unit that generates the integration object information including the estimated position of the object based on the integration target information.

2. The sensor recognition integration device according to claim 1, wherein the offset parameter update unit updates the offset parameter such that the offset to be applied to the sensor object information has a magnitude depending on an external situation.

3. The sensor recognition integration device according to claim 1, wherein the offset parameter update unit updates the offset parameter by adding a difference of an estimation target time to an offset duration time obtained by the association unit.

4. The sensor recognition integration device according to claim 1, wherein the integration target information generation unit adopts an offset function of reducing a magnitude of the offset to be applied to a position or a speed of the sensor object with time, and setting the magnitude to 0 for a predetermined offset application completion time.

5. The sensor recognition integration device according to claim 1, wherein the integration target information generation unit adopts an offset function of setting the offset to be applied to a speed of the sensor object to be a derivative of the offset to be applied to a position of the sensor object.

6. The sensor recognition integration device according to claim 1, wherein the integration target information generation unit adopts an offset function of determining an offset application completion time for each prediction object.

7. The sensor recognition integration device according to claim 1, wherein the integration target information generation unit adopts an offset function of causing a maximum value of a magnitude of a difference vector to be equal for all prediction objects, the difference vector being between the offset to be applied to a position or a speed of the sensor object and the offset to be applied to the position or the speed of the sensor object before a predetermined time.

8. The sensor recognition integration device according to claim 1, wherein the integration target information generation unit is configured not to apply the offset when it is determined that the offset is not required to be applied, by a situation of the sensor object.

9. The sensor recognition integration device according to claim 1, wherein the integration target information generation unit adopts an offset function capable of calculating the offset to be applied to the sensor object only by a product-sum operation.

10. A sensor recognition integration device that receives own-vehicle behavior information, sensor object information, sensor road information, positioning information, and map information acquired by an information acquisition device including an own-vehicle behavior recognition sensor, a plurality of external field recognition sensors, a positioning system, and a map unit, integrates the received information, and transmits a result of the integration to an autonomous driving plan determination device, the sensor recognition integration device comprising:

a sensor object information integration unit that integrates the sensor object information regarding a sensor object obtained by the plurality of external field recognition sensors recognizing an object in an external field, as integration object information; and an own-vehicle surrounding information integration unit that integrates the integration object information, the own-vehicle behavior information, the sensor road information, the positioning information, and the map information as own-vehicle surrounding information and outputs the own-vehicle surrounding information to the autonomous driving plan determination device, wherein the sensor object information integration unit includes an integration object information storage unit that stores the integration object information, a prediction update unit that extracts a prediction object to be predicted from the integration object information which is previously stored in the integration object information storage unit, and predicts a position of the prediction object after a predetermined time, without using the sensor object information, an association unit that estimates the prediction object to be associated with the sensor object information, an offset parameter update unit that updates an offset parameter required for calculating an offset to be applied to the sensor object information, an integration target information generation unit that calculates the offset to be applied to the sensor object information based on the offset parameter to apply the calculated offset to the sensor object and generates integration target information in which the prediction object and the offset-applied sensor object are linked to each other, based on an estimation result of the association unit, and an integration update unit that estimates the position of the object to generate integration object information, based on the integration target information.

* * * * *